(12) United States Patent
Pomerantz et al.

(10) Patent No.: US 11,351,627 B2
(45) Date of Patent: Jun. 7, 2022

(54) THREE-DIMENSIONAL LAMINATED METALLIC OBJECTS, METHOD AND SYSTEM OF MAKING SAME

(71) Applicant: Eshfartech Ltd., Kfar Saba (IL)

(72) Inventors: Uriel Pomerantz, Kefar Sava (IL); Itzhak Pomerantz, Kefar Sava (IL)

(73) Assignee: ESHFARTECH LTD., Kfar Saba (IL)

( * ) Notice: Subject to any disclaimer, the term of this patent is extended or adjusted under 35 U.S.C. 154(b) by 321 days.

(21) Appl. No.: 16/482,267

(22) PCT Filed: Jan. 30, 2018

(86) PCT No.: PCT/IL2018/050099
§ 371 (c)(1),
(2) Date: Jul. 31, 2019

(87) PCT Pub. No.: WO2018/142392
PCT Pub. Date: Aug. 9, 2018

(65) Prior Publication Data
US 2019/0344381 A1    Nov. 14, 2019

Related U.S. Application Data

(60) Provisional application No. 62/452,358, filed on Jan. 31, 2017.

(51) Int. Cl.
*B23K 20/00* (2006.01)
*B23K 20/02* (2006.01)
(Continued)

(52) U.S. Cl.
CPC ............ *B23K 20/023* (2013.01); *B23K 20/22* (2013.01); *B23K 20/24* (2013.01); *B32B 15/20* (2013.01);
(Continued)

(58) Field of Classification Search
CPC ............ B23K 2101/14; B23K 2103/10; B23K 20/002; B23K 20/02; B23K 20/023;
(Continued)

(56) References Cited

U.S. PATENT DOCUMENTS 5,382,505 A    1/1995  Schmidt et al.
5,876,550 A    3/1999  Feygin et al.
(Continued)

FOREIGN PATENT DOCUMENTS

CN    101932439    12/2010
DE    59206797     8/1996
(Continued)

OTHER PUBLICATIONS

Search Report dated Nov. 18, 2020 for corresponding European Application No. EP18747754.2.
(Continued)

*Primary Examiner* — Erin B Saad
(74) *Attorney, Agent, or Firm* — Pearl Cohen Zedek Latzer Baratz LLP (57) ABSTRACT

System and method of manufacturing a laminated three-dimensional (3D) metallic object. The method includes: providing a plurality of foils of metal; marking portions of some of the foils in the plurality of foils with a marking agent that includes a material having electrochemical potential higher than the metal; bonding the plurality of marked foils into a block; and selectively etching parts of the block not in proximity to the marking agent.

8 Claims, 7 Drawing Sheets

(51) Int. Cl.
  *B23K 20/22*    (2006.01)
  *B23K 20/24*    (2006.01)
  *B32B 15/20*    (2006.01)
  *B32B 37/02*    (2006.01)
  *B32B 37/06*    (2006.01)
  *B32B 37/10*    (2006.01)
  *B23K 103/10*   (2006.01)

(52) U.S. Cl.
  CPC .............. *B32B 37/02* (2013.01); *B32B 37/06* (2013.01); *B32B 37/10* (2013.01); *B23K 2103/10* (2018.08)

(58) Field of Classification Search
  CPC ...... B23K 20/026; B33Y 10/00; B33Y 30/00; B33Y 80/00
  See application file for complete search history.

(56) References Cited

U.S. PATENT DOCUMENTS

| | | | |
|---|---|---|---|
| 6,672,502 | B1 | 1/2004 | Paul et al. |
| 8,624,125 | B2 | 1/2014 | Shimokawa |
| 10,766,097 | B2 * | 9/2020 | Mayberry ............ B23K 20/106 |
| 11,035,833 | B2 * | 6/2021 | Steinke ............... F16K 99/0023 |
| 2005/0161146 | A1 | 7/2005 | Graf |
| 2011/0005812 | A1 | 1/2011 | Shimokawa |
| 2015/0083369 | A1 * | 3/2015 | Fryer ..................... B23K 20/24 |
| | | | 165/104.19 |
| 2016/0009069 | A1 * | 1/2016 | Mou ....................... B32B 37/02 |
| | | | 216/52 |
| 2017/0014954 | A1 | 1/2017 | Pomerantz et al. |

FOREIGN PATENT DOCUMENTS

| | | |
|---|---|---|
| EP | 0508946 | 10/1992 |
| GN | 105235208 | 1/2016 |
| WO | WO 2016/116924 | 7/2016 |

OTHER PUBLICATIONS

Office Action dated Feb. 19, 2021 for corresponding CN Application No. 201880019768X.

International Search Report of Application No. PCT/IL2018/050099 dated May 10, 2018.

* cited by examiner

THREE-DIMENSIONAL LAMINATED METALLIC OBJECTS, METHOD AND SYSTEM OF MAKING SAME

CROSS-REFERENCE TO RELATED APPLICATIONS

This application is a National Phase Application of PCT International Application No. PCT/IL2018/050099, International Filing Date Jan. 30, 2018, claiming the benefit of U.S. Patent Application No. 62/452,358, filed Jan. 31, 2017, which are hereby incorporated by reference.

FIELD OF THE INVENTION

The present invention relates generally to methods and systems for manufacturing three-dimensional (3D) objects. More specifically, the present invention relates to using foils for manufacturing a laminated 3D metallic objects.

BACKGROUND OF THE INVENTION

Known methods of manufacturing three-dimensional (3D) metallic objects include ancient processes to the most recent computerized technologies. 3D metallic objects can be cast into a shaped mold, machined from a block of solid metal and sintered from pressed powder. Modern methods used 3D computerized models of the 3D object in order to improve the manufacturing accuracy, increase efficiency and reduce costs. For example, in casting and sintering the molds may be manufactured using 3D models and the machining may be performed according to a 3D model. Some methods use 3D printing of an ink that include metal powder and solvent to form 3D objects and then consolidate the object by sintering.

All the known methods have their advantages and disadvantages. Casting allows manufacturing dense objects with unlimited composition but, is energy consuming, not very accurate and has strict geometrical requirements. Machining is limited to machinable alloys and machinable geometries and is further material wasteful. It is almost impossible to produce fully dense object by sintering. To reach high density the object must be treated with hot isostatic pressure (HIP). For all the above methods the higher the accuracy required the more expensive the manufacturing becomes.

Accordingly, there is a need for a new manufacturing method that may allow to produce highly accurate dense 3D metallic objects with lower amount of waste in comparison to machining and lower energy consumption in comparison to casting. There is further a need for manufacturing method that has minimal pre-processing and post processing stages.

SUMMARY OF THE INVENTION

Some aspects of the invention may be directed to a method of manufacturing a laminated three-dimensional (3D) metallic object. The method may include: providing a plurality of foils that may include a metal; marking portions of some of the foils in the plurality of foils with a marking agent that may include a material having electrochemical potential higher than the metal; bonding the plurality of marked foils; and selectively etching parts of the bonded block that are not marked by the marking agent.

Some embodiments, may further include stacking and tacking the plurality of foils. In some embodiments, the bonding may include providing at least one of: pressure and heat, to the plurality of marked foils. In some embodiments, the bonding may include thermal diffusion bonding. In some embodiments, the bonding may include forming transient liquid phase diffusion bonding between the metal in the foils and a component in the marking agent.

In some embodiments, the marking may include cladding at least some parts of some of the plurality of foils; and laser ablating at least portions of the cladding to remove the clad from portions of the foils. In some embodiments, the marking may include selectively depositing the marking agent on the surface of at least some of the foils. In some embodiments, the marking may be conducted according to a pattern determined based on a 3D model of the metallic object.

In some embodiments, the method may further include trimming the plurality of marked foils into a fixed size. In some embodiments, the method may further include boxing the plurality of marked foils into a box. In some embodiments, the boxing may include compressing while heating the plurality of marked foils in a box. In some embodiments, the boxing may include trimming the plurality of marked foils by sharp leading edges of the box.

In some embodiments, the method may further include removing gas trapped between foils in the plurality of marked foils by at least one of: gradient heating and applying a convex depression plate.

In some embodiments, the metal may include aluminum. In some embodiments, the material having electrochemical potential higher than the metal is at least one of: copper, gold, silver, and carbon. In some embodiments, the metal may be an aluminum alloy that may include less than 0.1 wt. % copper. In some embodiments, the thickness of the marking agent is at least two orders of magnitude smaller than the thickness of the foils. In some embodiments, the thickness of the foil may be no more than 100 μm. In some embodiments, the thickness of the marking agent in the marked portions is no more than 300 nm.

In some embodiments, the method may further include removing oxide layers from at least part of the surfaces of the foils prior to the marking In some embodiments, removing the oxide layers may be done by peeling a continuous foil.

In some embodiments, the method may further include turning at least some of the foils prior to stacking them.

In some embodiments, the bonding may be conducted under inert gas atmosphere. In some embodiments, selectively etching parts of the foils may include selectively etching the foils in the presence of an etchant.

Some additional aspects of the invention may be related to a system for manufacturing a laminated three-dimensional (3D) metallic object. The system may include a stacking unit for stacking a plurality of foils that may include a metal; a marking unit for marking portions of the plurality of foils with a marking agent; a bonding unit for bonding the marked plurality of foils; and an etching tank that may include an etching solution configured to etch parts of the plurality of marked foils.

In some embodiments, the system may further include a surface treatment unit configured to remove at least a part of an oxide layer from the foil prior to the marking.

In some embodiments, the system may further include: a controller, configured to: receive at least one model of the 3D object; receive at least one of: data related to the thickness of the foils and the height of the stacked plurality of foils; and determine the marking portions based on the 3D model and at least one of the thickness of the foils and the height of the stacked plurality of foils.

In some embodiments, the system may further include a trimming unit configured to trim the edges of the plurality of marked foils. In some embodiments, the system may further include a tacking unit configured to tack two foils in at least one point. In some embodiments, the system may further include a boxing unit configured to box the plurality of deposited foils in a box.

In some embodiments, the etchant is selected to cause galvanic-corrosion etching to parts of the bonded block not in proximity to the marking agent.

In some embodiments, the bonding unit may include at least one of: a pressing unit and a heating element.

In some embodiments, the system may further include a trapped gas removal unit that may include at least one of: a heating element and convex depression plate. In some embodiments, the system may further include an inert atmosphere supply unit.

Some additional aspects of the invention may be directed to a laminated three-dimensional (3D) metallic part. Such a metallic part may include a plurality of layers that may include a metal of at most 100 μm; and a plurality of thinner layers having a thickness of at most 300 nm, each thinner layer being located between two layers. In some embodiments, each thinner layer may include a material having electrochemical potential higher than the metal.

In some embodiments, the thinner layers may include an alloy that may include the metal and the material. In some embodiments, the thinner layers may have a eutectic microstructure. In some embodiments, the metal may include aluminum or aluminum alloy. In some embodiments, the aluminum alloy may include less than 0.1 wt. % copper. In some embodiments, the material may include at least one of: copper, silver, gold and carbon.

Some additional aspects of the invention may be directed to a laminated foil. The laminated foil may include a foil including an aluminum alloy having at least 85 wt. % aluminum and at most 0.1 wt. % copper, the foil having a thickness of at most 100 μm; and a layer of at most 300 nm laminated at least a portion of one surface of the foil, the layer may include copper. In some embodiments, the layer may include a copper alloy. In some embodiments, the foil may have a thickness of 5-50 μm. In some embodiments, the layer may have a thickness of at most 200 nm. In some embodiments, the foil may further include magnesium. In some embodiments, the foil may further include at least one of: zinc and silicon. In some embodiments, the laminated foil may have a yield strength of at least 150 MPa.

Some additional aspects of the invention may be directed to a laminated foil. The laminated foil may include: a foil having a heat-treatable aluminum alloy having at least 85 wt. % aluminum and at most 0.1 wt. % of an additional material, the foil may have a thickness of at most 100 μm; and a layer of at most 300 nm that includes the additional material laminated to at least a portion of one surface of the foil. In some embodiments, the additional material may have electrochemical potential higher than the aluminum and a heat-treatment applied to the aluminum alloy is precipitation-hardening.

BRIEF DESCRIPTION OF THE DRAWINGS

The subject matter regarded as embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspects of the invention may be directed to a system and a method of manufacturing laminated three-dimensional (3D) metallic object. A 3D object according to some embodiments of the invention may be produced from a plurality of foils each marked (e.g., laminated, deposited etc.) with marking agent that may include an additional material (e.g., copper) having electrochemical potential higher than the main metal included in the foil (e.g., aluminum). The marked areas may cover only a portion of each foil according to a 3D model of the final 3D object. In some embodiments, the marked foils may be pressed and heated to allow bonding of the foils. When inserted into an etching tank, portions of the bonded block not in proximity to the marking agent may be selectively etched and the bonded marked portions may be protected from the etching due to the higher electrochemical potential of the marking agent.

In some embodiments, the product of such a method may be a 3D laminated object that includes alternating structure of layers that include the foil material and layers that include the marking agent.

As used here the term "foil" may be directed to any thin sheet/film/foil made from metals or alloys, for example, aluminum, aluminum alloys, titanium, titanium alloys and the like. The foil may be extruded, rolled, from a bulk material or may be manufactured according to any method known in the art. A foil according to some embodiments of the invention may have a thickness of at most 100 µm, for example, 5-50 µm. In some embodiments, the foil may be made from a heat-treatable alloy, for example, the precipitation-hardened aluminum alloys form the ASM 6xxx and 7xxx series.

As used herein the term "marking agent" may be directed to any material that may be laminated, deposited, sprayed, applied, jetted, and the like, on to a surface of the foil using any known method, for example, cladding, depositing, jetting, spraying, etc. At least one material included in the marking agent may have electrochemical potential higher than the metal included in the foil. For example, if the foil includes aluminum the marking agent may include copper, gold, silver, platinum or carbon (e.g., graphite), which have electrochemical potential higher than aluminum.

In some embodiments, the amount of the material having the electrochemical potential higher than the metal (e.g., copper or carbon) may be limited in the alloy of the foil. For example, the amount of copper in any aluminum alloy of the foils may be limited to be no more than 0.1 wt. %. In some embodiments, the foils may be pre-laminated with the marking agent.

Reference is now made to FIG. 1 which is a high-level block diagram of a system for manufacturing a laminated three-dimensional (3D) metallic object according to some embodiments of the invention. A system 100 for manufacturing a laminated three-3D metallic object may include: a stacking unit 110, a marking unit 114, a bonding unit 129 and an etching tank 130. In some embodiments, system 100 may further include a tacking unit 112, a trimming unit 124, a boxing unit 126, a controller 140, a surface treatment unit 150 and a trapped gas removal unit 135.

Figure 1A:
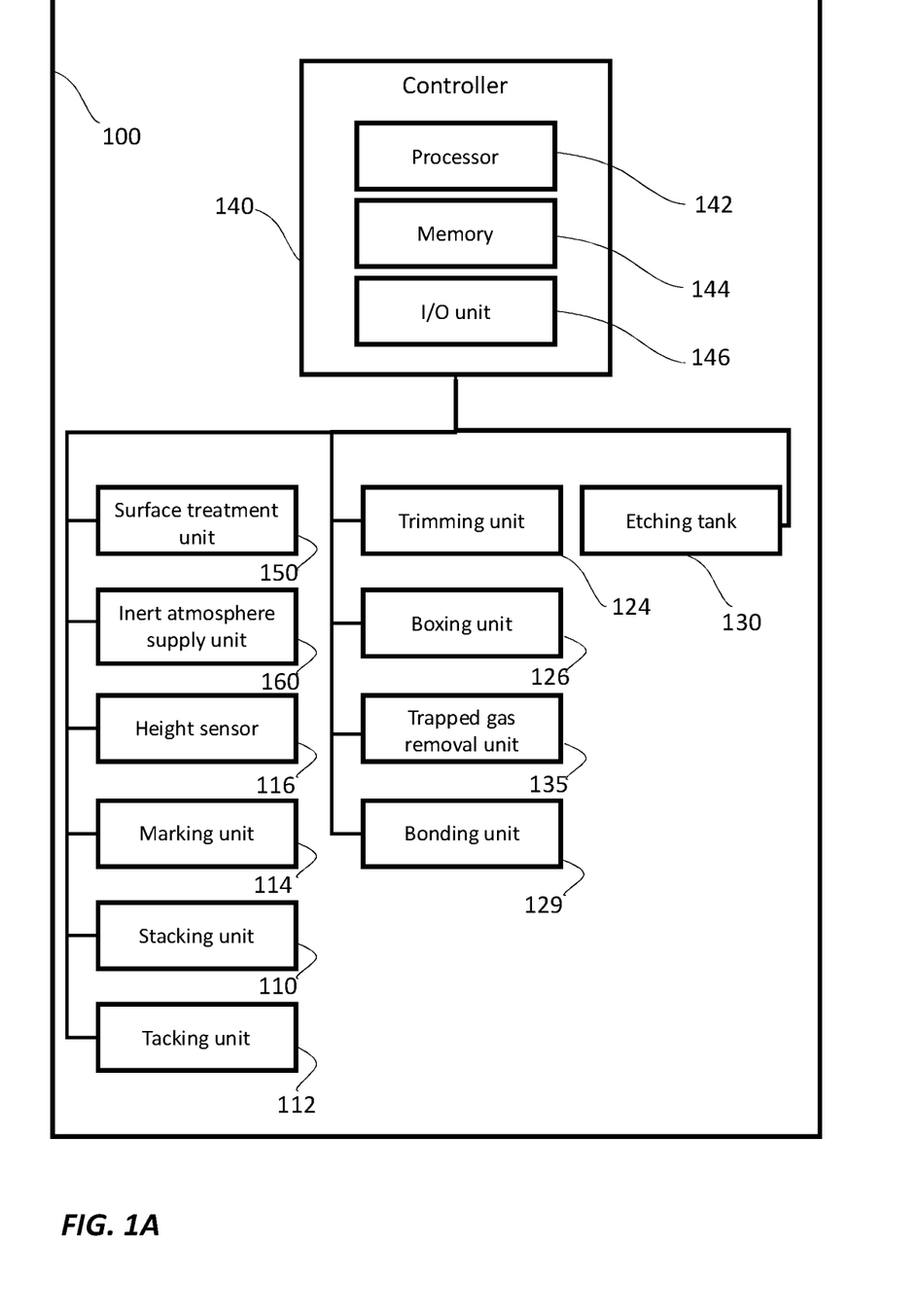
FIG. 1A is a high-level block diagram of a system for manufacturing a laminated three-dimensional (3D) metallic object according to some embodiments of the invention.

In some embodiments, stacking unit 110 may be configured to stack a plurality of foils that may include a metal, such as aluminum or titanium. A feedstock of foils (e.g., a roll of aluminum alloy foil) may feed the foil to a stacking unit 110 to be cut into sheets and stacked one on top of the other, by for example, a robotic unit or any other method known in the art. Stacking unit 110 may further cut the fed foils from the roll into a required length.

Figure 4:
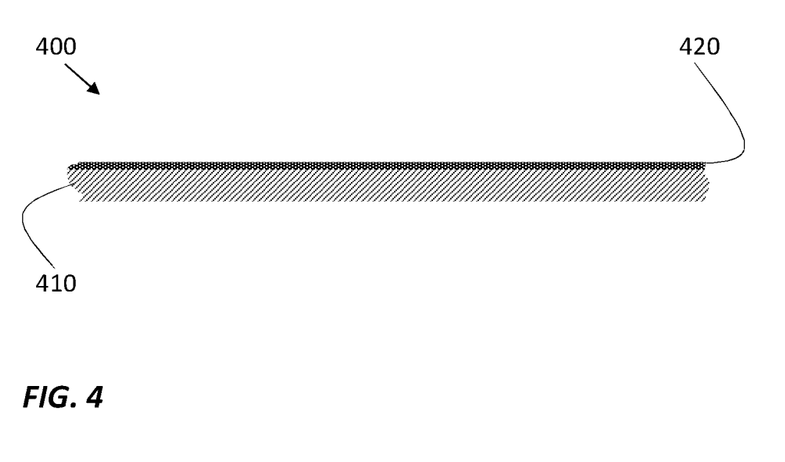
FIG. 4 is an illustration of a laminated foil according to some embodiments of the invention.

In some embodiments, marking unit 114 may include any device or system that may allow marking portions of the plurality of the foils with a marking agent. In some embodiments, the marking agent may include a material having electrochemical potential higher than the metal. In some embodiments, the foil may be pre-laminated with the marking agent (e.g., a laminated foil 400, cladded with copper as illustrated in FIG. 4)) and marking unit 114 may include an ablation device (e.g., laser ablation unit) for removing portions of the cladding/lamination to expose portions of at least some of the foils. In some embodiments, the foils may not be laminated/covered by the marking agent and marking unit 114 may include a selective deposition unit (e.g., a printing unit) for selectively depositing the marking agent on at least some areas of some of the foils. In some embodiments, the ablation of the cladded foils or the selective deposition may be according to a determined pattern. In some embodiments, the determined pattern may be received from controller 140, as will be discussed below with respect to FIGS. 2A and 2B.

In some embodiments, stacking unit 110 may place a foil to be marked by marking unit 114. The sequence of stacking and marking may continue until all required foils for building one or more 3D objects were placed and marked. In some embodiments, for allowing an accurate placement and marking of the foils and preventing the marked foils from moving out of registration, each two consecutive foils may be tacked to each other, by a tacking unit 112, in at least one point before the marking. Tacking unit 112 may include a welding unit, a brazing/soldering unit, a gluing unit and the like. In some embodiments, in order to verify the height of the stack of foils during the stacking/marking process, system 100 may include a height sensor 116 (e.g., a linear mechanical probe, a laser distance sensor and the like) as will be discussed with respected to FIG. 2B.

In some embodiments, an oxide layer attached to at least one surface of the foil (e.g., the surface not cladded/laminated with the marking agent, or both surfaces when the foil is not pre-laminated at all) may be removed by surface treatment unit 150. Surface treatment unit 150 may include any device or system known in the art that may allow to remove at least a portion of an oxide layer from a foil. For example, surface treatment unit 150 may be a device for abrasively peeling the oxide layer from the foil. The device may include any polishing medium which may conduct wet or dry polishing and any means to clean the surface of the foil from the removed peeled oxide layer.

Figure 1B:
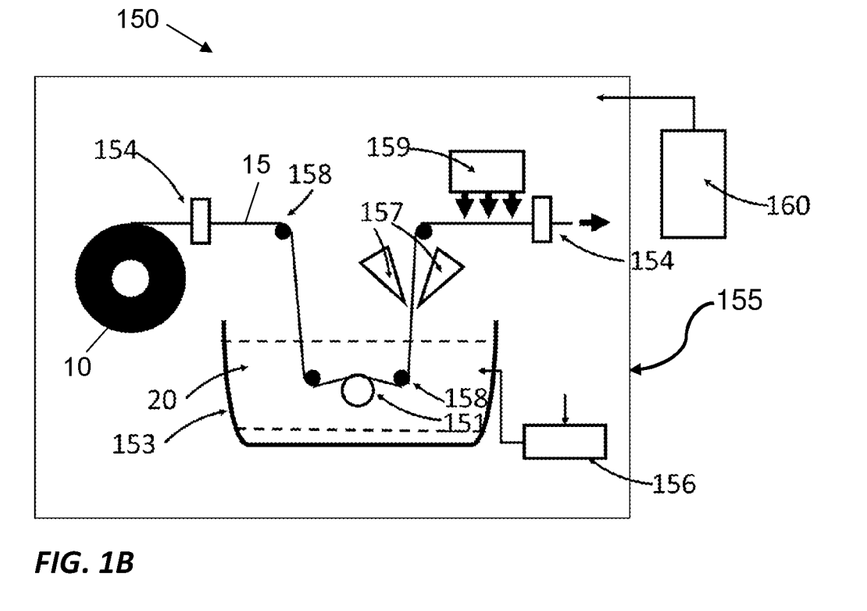
FIG. 1B is an illustration of a surface treatment unit according to some embodiments of the invention.

A non-limiting example of such surface treatment unit 150 is illustrated in FIG. 1B Surface treatment unit 150 may include one or more abrasive cylinders 151, rotating against moving foil 15 in a bath 153 of non-oxidizing solvent 20. Foil 15 may be fed from roll 10 and inserted into sealed housing 155 and directed to and from bath 153 by one or more rollers 158. One or more abrasive cylinders 151 may include a porous abrasive material permeated with non-oxidizing solvent 20. Non-limiting examples of non-oxidizing solvent 20 may be or may include: volatile solvent, such as acetone, non-oxidizing volatile solvent with low solubility in water in order to readily siphon off aggregated moisture, such as n-hexane, and un-flammable liquid, such as tetrachloroethylene. A device 156 may continuously condense solvent 20 vapors from housing 155 and pump the condensed non-oxidizing solvent 20 back to bath 153.

In some embodiments, surface treatment unit 150 may further include one or more sensors 154 for measuring multi-point thickness measurements before and after abrasive cylinders 151, as will be discussed with respect to FIG. 2A. In some embodiments, at least some of the components of surface treatment unit 150 may be controlled by a controller, for example, controller 140. In some embodiments, controller 140 may control controllable elements, such as, abrasive cylinders 151, the speed and/or tension of foil 15, etc. in a closed loop according to measurements received from one or more sensor 154. In some embodiments, the solvent in bath 153 may continuously be filtered to extract solids peeled from the surface of foil 152 and returned to bath 153 via nozzles 157. In some embodiments, the peeled foil 15 may be dried by drier 159, using any known drying method.

In some embodiments, to prevent the oxide layer from being rebuilt on the peeled surface(s) of foil 151, at least the oxide removing, and the marking processes may be conducted under an inert atmosphere. Accordingly, system 100 may include inert atmosphere supply unit 160. Inert atmosphere supply unit 160 may include any device (e.g., a pump, a pressurized container, etc.) that is configured to supply inert gas (e.g., Ar, etc.) to at least surface treatment unit 150 and marking unit 114. In some embodiments, in order to avoid re-oxidation of foil 15, surface treatment unit 150 may be enclosed in sealed housing 155. Sealed housing 155 may include an inert atmosphere, for example, argon. In some embodiments, surface treatment unit 150 may include a non-oxidizing liquid bath 153 to prevent re-oxidizing or re-nitriding of foil 15 surface. In some embodiments, surface treatment unit 150, marking unit 114, stacking unit 110 and tacking unit 112 may all be included or housed in a sealed single container (e.g., housing 155) and, the peeling stacking, tacking and marking processes may all be conducted under the inert atmosphere.

Referring back to FIG. 1A, in some embodiments, bonding unit 129 may include devices that may allow the marked foils in the stack to be bonded together. For example, bonding unit 129 may include at least one heating element that may be configured to heat the marked foils to a temperature that prompts solid state thermal diffusion bonding (e.g., around 500° C. for aluminum alloys) or forming transient liquid phase diffusion bonding between the metal in the foils and the material of the marking agent (e.g., above 548.2° C. when the foil includes pure aluminum and the material is copper). In some embodiments, bonding unit 129 may further include a pressing unit (e.g., a press) for applying pressure on the stacked marked foils. For example, the pressing unit may apply pressure of between 10 and 80 MPa in order to promote bonding either with or without heating the marked foils.

In some embodiments, the applied pressure (and heat) may cause the stack to deform in particular at the edges of the stack. Accordingly, in some embodiments, prior to bonding, the marked foils may be trimmed and boxed in order to restrain the stack from all directions during bonding, thus avoiding the deformation. Trimming unit 124 may include any device that may allow cutting edges of the marked foils in order to be fixed into a box. For example, trimming unit 124 may include, a guillotine blade, milling unit, a grinding unit, ultrasonic cutting unit and the like. In some embodiments, the trimmed foils may be inserted to be boxed in boxing unit 126. The boxing may prevent the stack of foils from being deformed during the pressure/heat application in bonding unit 120. In some embodiments, trimming unit 124 and boxing unit 126 may be included in a single unit. Accordingly, a very high pressure (e.g., 80 MPa for aluminum foils) may be applied under high temperature (e.g., 570° C. for aluminum foils) while avoiding any deformation or distortion of the foils and the marked portions, thus maintaining the accurateness of the dimensions of the foils marking.

Figure 1C:
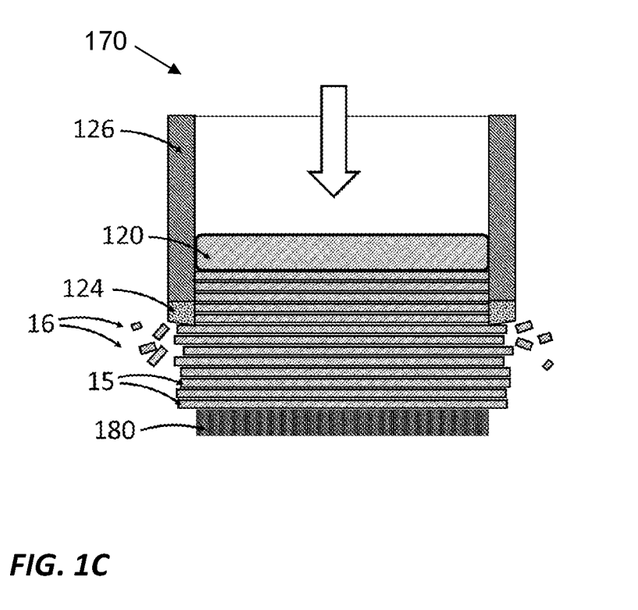
FIGS. 1C and 1D are illustration of a trimming, boxing and bonding unit according to some embodiments of the invention.
Figure 1D:
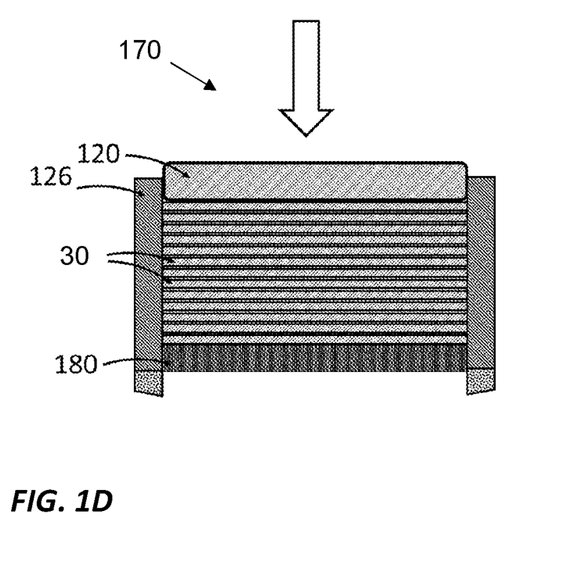

A non-limiting example of a unit for trimming, boxing and bonding a stack of foils is given in FIGS. 1C and 1D. Unit 170 may include a bonding unit (129 in FIG. 1A) that may include, a compression plate 120. Unit 170, may further include, according to some embodiments, trimming unit 124 in the form of blades mounted on boxing unit 126 that includes a box to enclose and fix foils 15 in the box. In some embodiments in a single operation unit 170 may trim, box and bond foils 15 into stack 30. In some embodiments, edges 16 of foils 15 may be trimmed using the blades of trimming unit 124 mounted on the leading edge of the box structure of boxing unit 126 (as illustrated in FIG. 1C). The process may continue until the entire stack 30 is forced into the box of boxing unit 126 (as illustrated in FIG. 1D). In some embodiments, the pressure from compression plate 120 may be applied during or following the trimming and boxing process. In some embodiments, heating may be applied together with the pressure. For example, heating elements may heat the compression plate 120 of the bonding unit 129, the walls of the box in boxing unit 126, a build plate 180 at which the foils are to be placed or any combination thereof. After the bonding stack 30 may be extracted from the box, using any known device.

In some embodiments, system 100 may further include a trapped gas removal unit 135 for removing gas trapped between foils during the stacking process. Trapped gas removal unit 135 may include, for example, at least one heating element for promoting directional flow of trapped air molecules, convex depression plate and the like.

Figure 1E:
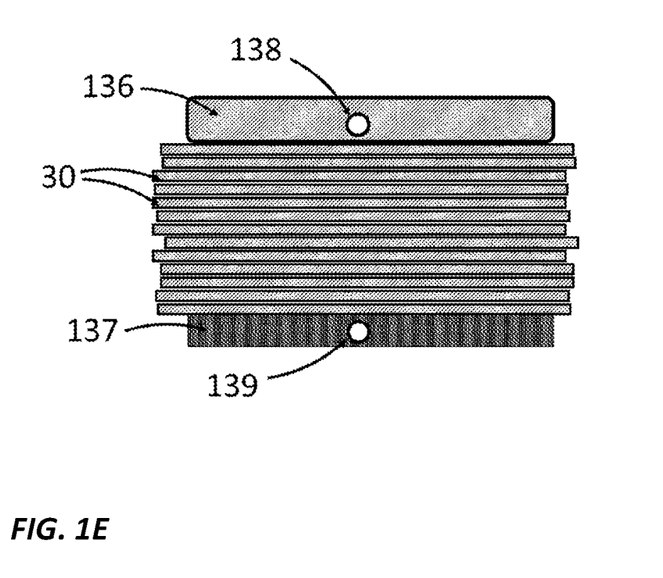
FIGS. 1E-1G are illustrations of a gas removal unit according to some embodiments of the invention.
Figure 1F:
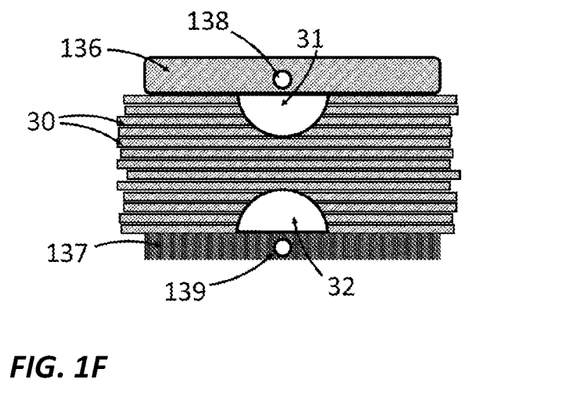
Figure 1G:
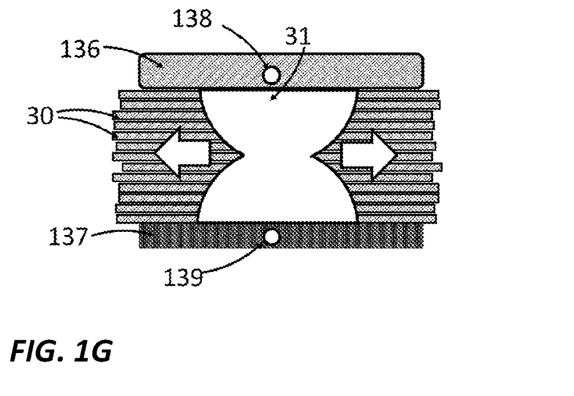

A non-limiting example of such gas removal unit 135 is given in FIGS. 1E-1G. Gas removal unit 135 may include a compression plate 136 that includes a heating element 138 and a build plate 137 that includes a heating element 139. In some embodiments, heating elements 138 and 139 may apply local heating to stack 30, as to form heated zones 31 and 32 respectively. Heat from heated zones 31 and 32 may propagate and collide in the stack as illustrated in FIG. 1G. In some embodiments, the metal in the heated zones may expand thus may create local compression between expanded foils as to push away gas trapped between the foils. The gas may be pushed towards cooler zones of stack 30. As the heat propagates from the central part of stack 30 towards the sides of the stack, the trapped gas may be purged out.

In some embodiments, the bonded stack may be introduced into etching tank 130 that includes an etching solution configured to etch parts of the bonded block. In some embodiments, the etching solution may be configured to etch parts not in proximity to the marking agent. As used herein, the term "not in proximity" may refer to portions that may not be affected by the galvanic protection provided by the marking agent, therefore may be etched by the etchant. In some embodiments, the etchant may be configured to etch parts that are in proximity to the marking agent. In some embodiments, the etchant may be selected in order to cause galvanic corrosion in sacrificial portions of the stack, e.g., the portions not in proximity to the marking agent. For example, when using aluminum alloy foils marked with copper, the etching solution (i.e., the etchant) may include sodium chloride aqueous solution that etches and remove the aluminum portions not in proximity with the copper. In some embodiments, the etchant may further include an acid, such as citric acid. The copper marking may protect the aluminum in proximity with the copper from the galvanic corrosion.

Controller 140 may include, a processor 142 that may be, for example, a central processing unit (CPU), a chip or any suitable computing or computational device, a memory 144 and an input/output unit 146. Memory 144 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 144 may be or may include a plurality of, possibly different memory units.

Memory 144 may store any executable code, e.g., an application, a program, a process, task or script. The executable code may include codes to operate and control at least some of the components of system 100 or any other codes or instruction for executing methods according to embodiments of the present invention. In some embodiments, controller 140 may be configured to receive a 3D model of at least one 3D object and to control the operation of system 100 based, among other things, on the 3D model, as disclosed herein with respect to FIGS. 2A and 2B.

Input/output unit 146 may include any unit that may allow controller 100 to receive and provide instructions from and to a user. For example, input/output unit 146 may include a screen, a touchscreen, a keyboard, a mouse, speakers, a wired or wireless network interface card (NIC), a modem, printer or facsimile machine, a universal serial bus (USB) device or external hard drive may be included in input/output unit 146.

Figure 2A:
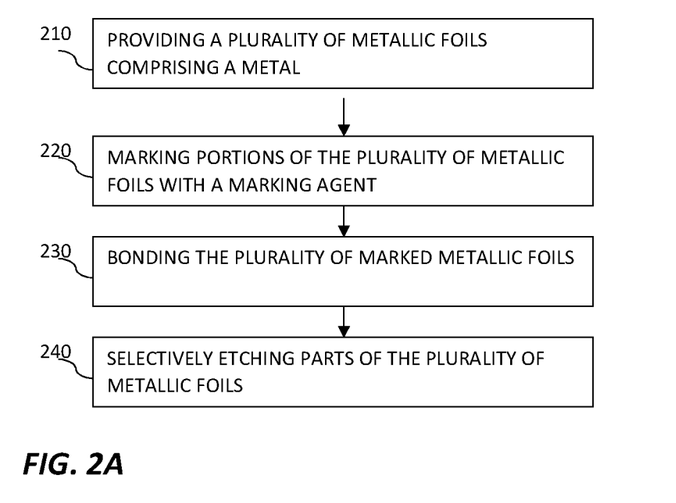
FIG. 2A is a flowchart of a method of manufacturing laminated three-dimensional (3D) metallic object according to some embodiments of the invention.

Reference is now made to FIG. 2A which is a flowchart of a method manufacturing a laminated three-dimensional (3D) metallic object according to some embodiments of the invention. In some embodiments, a plurality of foils (e.g., foils 15 or foils 400) that may include a metal may be provided, in step 210. The foils may be provided from a roll such as roll 10 to be cut into foils (e.g., sheets), or may be provided as discrete foils or sheets. The foils may include aluminum alloys (e.g., from the SAE 2XXX, 3XXX, 4XXX, 5XXX, 6XXX and 7XXX series). In some embodiments, the foils may include titanium alloys or any other metallic alloy. In some embodiments, the alloy included in the foil may include less than a predetermined amount of the marking agent. For example, the foils may include aluminum alloys having less than 0.1 wt. % copper.

In some embodiments, oxides from at least one surface of the foils may be removed, for example, by peeling a continuous foil using surface treatment unit 150 discussed herein. In some embodiments, portions of the plurality of foils may be marked with a marking agent, in step 220, for example, by marking unit 114. In some embodiments, the marking agent may include a material having electrochemical potential higher than the metal. For example, if the foils may include aluminum alloys the marking agent may be, copper, carbon (e.g., graphite), silver, gold, platinum and the like. In some embodiments, the marking may include a selective deposition of the marking agent (e.g., using an inkjet printing device). In some embodiments, the foils may be pre-laminated/pre-cladded with a marking agent (e.g., a copper cladded on an aluminum alloy foil as illustrated in FIG. 4) and the marking may include laser ablation of the cladded foil to expose portions of the aluminum foil.

In some embodiments, in order to protect the surface of the foils from oxidation, at least one of: the oxidation removal, stacking, tacking and marking may be conducted under protective atmosphere, for example, argon.

In some embodiments, in order to accurately mark the foils, every new foil may first be stacked one on top of the stack using, for example, stacking unit 110. After each foil stacking, the upper foil may be tacked to the previous foil, using any known method, for example, using tacking unit 112. The foils may be tacked using, for example, spot-welding, seam welding, ultrasonic welding, gluing, male-female dents, brazing, soldering and the like.

In some embodiments, the foils may have slight thinness deviations between foils and in different areas in a single foil, for example, parallel to the edge of the foil. Accordingly, in order to reduce the odds of getting height deviation, when all thicker edges are stacked together, the foils may be turned around a vertical axis. For example, at least some of the foils may be turned, before the stacking, at 90°, 180° and 270°. In some embodiments, the height of the stack, in at least one point, may be measured by a sensor such as sensor 154 and controller 140 may determine if a turning of the foil is required and at which angle based on the measurements.

In some embodiments, the marked portions of each foil may be determined based on a 3D structure of at least one 3D object. Controller 140 may receive, for example, via I/O unit 146 a 3D model of one or more objects, for example, the object illustrated in FIG. 3A and/or the objects illustrated in FIG. 3B. In some embodiments, controller 140 may further receive at least one of: data related to the thickness of the foils and the height of the stacked plurality of foils (e.g., from height sensor 116). In some embodiments, controller 140 may determine the marking portions based on the 3D model and at least one of the thickness of the foils and the height of the stacked plurality of foils. For example, controller 140 may divide the 3D model to layers each having a thickness of one foil (e.g., 50 µm) and determine the marked portions to overlap with the divide layers (e.g., the pattern marked on the foil overlap with a corresponding divided layer). In some embodiments, controller 140 may determine to marked portions of the foils not to be included in the 3D object, such that the unmarked portions overlap with the divide layers. However, since there may be thickness deviations between foils, determining the marked portions solely based on the thickness of the foils may lead to an accumulated error.

Figure 2B:
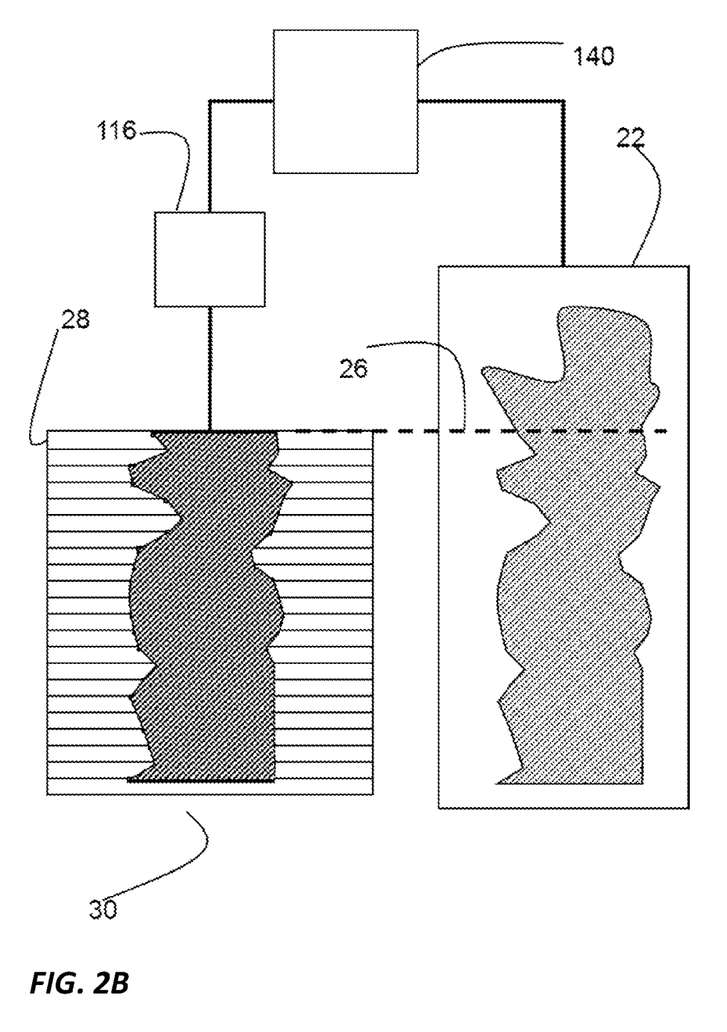
FIG. 2B is an illustration of a process of determining the marked portion at each foil according to some embodiments of the invention.

Accordingly, controller 140 may determine the marked portions based on measurements of the height of the stacked plurality of foils received from sensor 116. Reference is now made to FIG. 2B with is an illustration of process of determining the marked portion at each foil according to some embodiments of the invention. In some embodiments, an elevation (height) 26 of a current foil 28 in a stack may continuously be measured by sensor 116. In some embodiments, controller 140 may initially receive the height/thickness of the first foil and determine the pattern of the first marked portion based on the height/thickness. Controller 140 may continually receive height measurements, for example, for every foil, every two foils or any predetermined number of placed foils. Controller 140, may then: determine, in real time, the required pattern based on the corresponding elevation 26 at the 3D model, or associate measured elevation 26 with a corresponding layer in the 3D model having a predetermined pattern.

In some embodiments, elevation 26 of the current stack may be measured in more than one point on the current foil. If the multiple measurements yield that the current surface of the stack is not horizontal or not planar, controller 140 may estimate the actual non-planar surface through the measured points, and further use the 3D model of the one or more objects to determine a non-planar pattern to be marked of the foil. Controller 140 may intersect the determined non-planar surface with the 3D model. Accordingly, controller 140 may correct accumulated errors caused by variations in the foils' thickness, while ensuring that the object may be built accurately.

Referring back to the flowchart of FIG. 2A, in some embodiments, the plurality of marked foils may be bonded together, at step 230. The stack, such as stack 30 may be bonded together by providing at least one of: pressure and heat, to the plurality of marked foils, using for example, bonding unit 129. In some embodiments, the bonding may include thermal diffusion bonding, for example, due to solid state diffusion of the at least one component of the marking agent into the alloy of the foil or vice versa. For example, copper from the marking agent may at least partially diffuse into aluminum alloy foil, when the aluminum alloy includes less than 0.1 wt. % copper. In some embodiments, bonding may include forming transient liquid phase diffusion bonding between the metal in the foils and a component in the marking agent. For example, aluminum alloy enriched with copper due to diffusion of copper in the interface between the foil and the marking agent, may reach the eutectic composition and melt if the bonding temperature reach the eutectic temperature. In such case, the interface between the marking agent and the foil may have a eutectic microstructure.

In some embodiments, prior to bonding the method may further include trimming the plurality of marked foils into a fixed size using, for example, trimming unit 124. In some embodiments, the trimming may be conducted to cut off edges of the foils forcing the stack to fit a box. In some embodiments, trimming may be conducted using: guillotine like blades (e.g., as illustrated in FIG. 1C), milling, grinding and the like. In some embodiments, the trimmed stack may be boxed in a box by boxing unit 126. In some embodiments, the trimming and boxing processes may be conducted by a single unit, for example, unit 170, illustrated in FIGS. 1C and 1D. In such case the boxing may include trimming the plurality of marked foils by sharp leading edges of the box. In some embodiments, the bonding may also be conducted by unit 170, as disclosed above. Accordingly, applying pressure and heat to stack of foils when the stack is boxed in a box, may allow reducing and even eliminating, deformations and distortions that may occur during pressure. Applying high pressure, in particular, while heating the foils may cause extensive plastic deformation. Therefore, if the pressure and heat would be applied to the stack while there is at least one of opening in the box, the material from the stack would flow out under the pressure and leak out through such openings. Then the stack may plastically deform, thus deforming the 3D geometry of the marking portions.

In some embodiments, following the stacking and before the bonding the method may include removing gas trapped between foils in the plurality of marked foils by at least one of: gradient heating and applying a convex depression plate, using for example, trapped gas removal unit 135. A non-limiting example for such unit and the process for removing gas trapped between the plurality of marked foils was given in FIGS. 1E-1G.

In some embodiments, parts of the bonded block, for example, the ones not in proximity to the marking agent or the ones in proximity to the marking agent, may be selectively etched in step 240. In some embodiments, the bonded block (e.g., stack 30) may be inserted into etching tank 130 as to selectively etch parts of the block to create one or more 3D objects, for example, object 300 illustrated and discussed with respect to FIG. 3A. In some embodiments, each block may include a plurality of 3D objects, for example, one or more objects such as parts 300 and a plurality of scrap objects 350 illustrated and discussed with respect to FIG. 3B.

In some embodiments, in order to ensure full etching of all sacrificial portions (e.g., the unmarked portions) in stack 30, some sacrificial material should remain in tank until all the 3D objects are completely created. The added sacrificial material may be added as a temporary add-on portion to the geometry of at least some 3D objects. The add-on portion may allow to preserve an amount of unmarked alloy at least until all the unmarked portions around the 3D objects are fully etched. Such add-on portions may include an external shell made of marked alloy, and a core made of unmarked alloy. The Shell may include a path to allow the etchant to access the core. In some embodiments, the shell may be as thin as possible. The etchant reaching the core may etch away the unmarked alloy in the core leaving a hollow shell. The core of the add-on portion may be designed to be fully etched at longer periods of time than the one needed for etching all the other unmarked portions of stack 30. The hollow shell may be mechanically removed from the 3D object after completion of the process using any known method.

In some embodiments, the 3D objects may further be washed cleaned and dried according to any method known in the art.

Figure 3A:
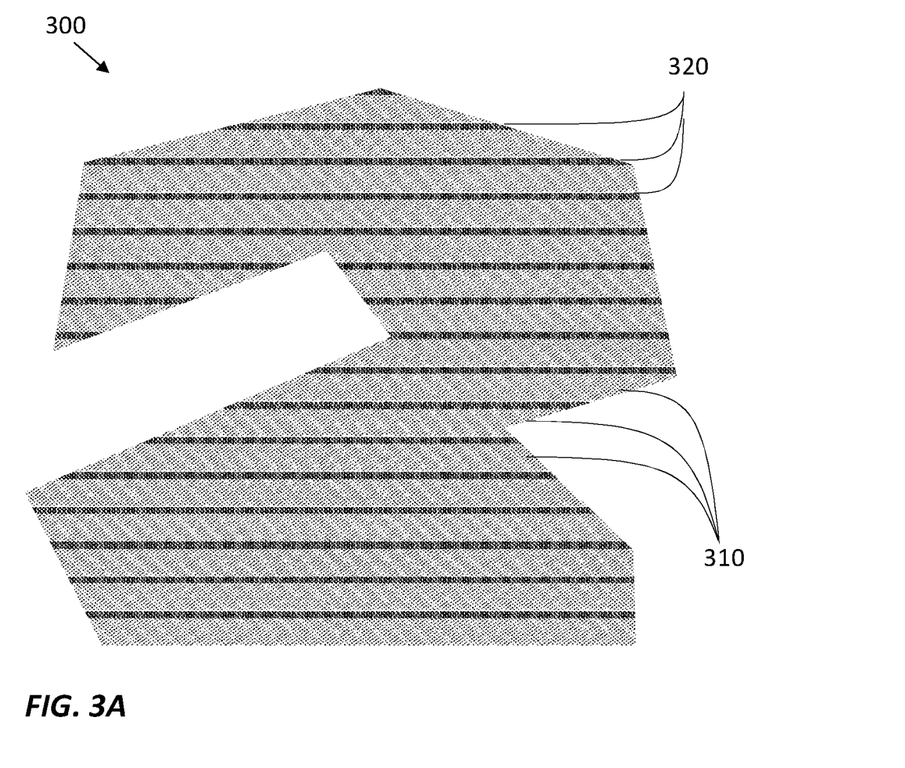
FIG. 3A is an illustration of a laminated three-dimensional (3D) metallic object (e.g., a part) according to some embodiments of the invention.
Figure 3B:
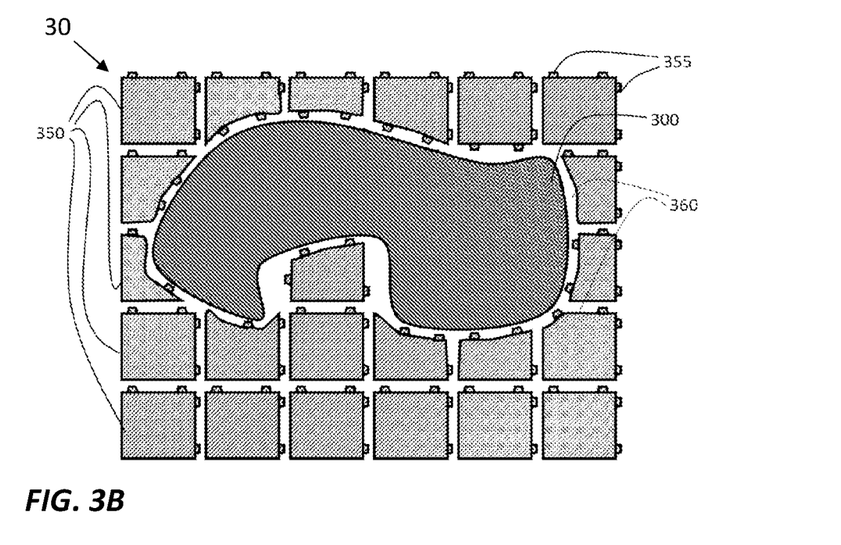
FIG. 3B is an illustration of a stack of laminated foils marked with a 3D part and a plurality of additional scrap objects according to some embodiments of the invention.

Reference is now made to FIG. 3A which is an illustration of a laminated 3D metallic part according to some embodiments of the invention. Part 300 may include a plurality of layers 310 that may include a metal, of at most 100 µm, for example, 5 µm, 10 µm, 20 µm, 40 µm, 50 µm, 60 µm, 70 µm and 80 µm. For example, layers 310 may include an aluminum alloy, for example, from the SAE 2XXX, 3XXX, 4XXX, 5XXX, 6XXX and 7XXX series. In some embodiments, the aluminum alloy may include less than 0.1 wt. % copper. Part 300 may further include a plurality of thinner layers 320 having a thickness of at most 300 nm, each thinner layer being located between two layers 310. For example, thinner layers 320 may have a thickness of, 10 nm, 30 nm, 50 nm, 100 nm, 150 nm, 200 nm and the like. In some embodiments, each thinner layer may include a material having electrochemical potential higher than the metal, for example, copper, carbon (e.g., graphite), silver, gold and the like. In some embodiments, thinner layers 320 may include an alloy that may include the metal and the material, for example, an aluminum alloy having more than 0.1 wt. % copper. In some embodiments, 3D part 300 may be the parts of the process disclosed herein.

In some embodiments, more than one 3D part may be included in a stack, for example, one or more part 300 and a plurality of scrap objects 350, as illustrated in FIG. 3B. Scrap objects 350 may be recycled, and re-melted to produce other aluminum products. Accordingly, it may be beneficial to have as much total volume of scrap objects 350 as possible in stack 30. However, the etching process requires free access of etchant to portions configured to be sacrificed or etched. Accordingly, the size, geometry and location of scrap objects 350 must be predetermined to allow efficient etching process.

In some embodiments, as the etching progresses and the material in sacrificial portions 360 dissolves, the 3D objects (both 300 and 350) may collapse on each other due to their weight, and passages of etchant between them may be partially or fully blocked. Accordingly, there is a need to allow free flow of the etchant between the 3D objects even when sacrificial portions 360 are dissolved. In some embodiments, in order to prevent large contact areas between the collapsing 3D objects, scrap objects 350 may include small bumps 355. Small bumps 355 may serve as mechanical separators between different scrap objects 350 and between scrap objects 350 and part 300. The mechanical separators may allow a continuous provision of etchant to sacrificial portions 360.

Figure 3C:
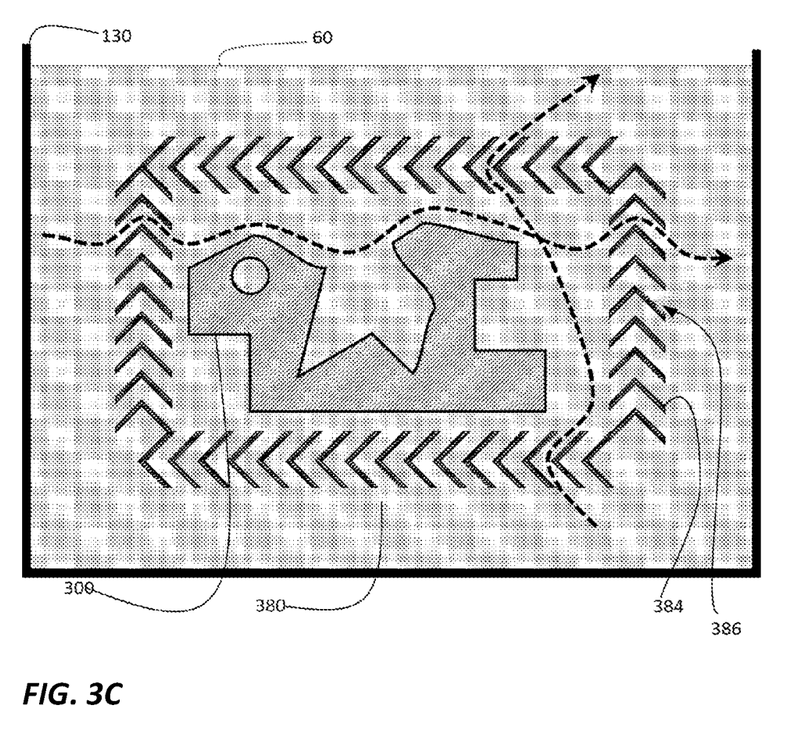
FIG. 3C is an illustration of a stack of laminated foils marked with a 3D part located inside a 3D cage placed in an etching tank according to some embodiments of the invention.

Reference is now made to FIG. 3C which is an illustration of a stack of laminated foils marked with one or more 3D parts located inside a 3D cage placed in an etching tank according to some embodiments of the invention. A method and system according to some embodiments of the invention may allow to manufacture one or more 3D parts 300 inside a "cage" object 380 such that after the etching (e.g., of step 240) 3D parts 300 there are hidden by the cage and are not visible. Accordingly, the manufacturer may not be able to see one or more parts 300 and the parts may be exposed only to an authorized user.

In some embodiments, the 3D objects marked by the marking agent may include cage object 380 and one or more parts 300 marked such that upon etching of the unmarked portions in the stack, one or more parts 300 are created to be located inside cage object 380. Cage object 380 may include a plurality of shades 384 separated by gaps 386 (the material in gaps 386 is unmarked), such that when the stack is placed in tank 130 an etchant 60 may etch first the sacrificial material in gaps 386 and then be able to penetrate, flow and etch the sacrificial material surrounding one or more objects 300. The flow of etchant 60 may be according to the dashed arrows illustrated in FIG. 3C. Accordingly, at the end of step 240, one or more parts 300 may be "trapped" inside cage object 380.

Reference is now made to FIG. 4 which is an illustration of a laminated foil according to some embodiments of the invention. A laminated foil 400 may include a foil 410 that may include an aluminum alloy having at least 85 wt. % aluminum and at most 0.1 wt. % of an additional material, for example, copper, foil 410 may have a thickness of at most 100 µm. Laminated foil 400 may further include a layer 420 of at most 300 nm laminated to one surface of foil 410, layer 420 may include the additional material, for example, copper. In some embodiments, the additional material may have electrochemical potential higher than the aluminum. In some embodiments, foil 410 may include heat treatable aluminum alloys (e.g., heat treatable by precipitation hardening, which is also known in the art as aging), for example, SAE 6XXX and 7XXX series. In some embodiments, other aluminum alloys disclosed herein may be included in foil 410. In some embodiments, foil 410 may have a thickness of 5-50 µm. In some embodiments, thinner layer 420 may have a thickness of at most 200 nm, for example, 5-100 nm.

In some embodiments, the aluminum alloy in foil 410 may include magnesium. In some embodiments, the aluminum alloy in foil 410 may further include at least one of: zinc and silicon. In some embodiments, laminated foil 400 may have a yield strength of at least 150 MPa, for example, 250 MPa, 400 MPa or more. Some examples of aluminum alloys for foil 410 are given in table 1.

TABLE 1

| elements | Alloy | | | | | |
| --- | --- | --- | --- | --- | --- | --- |
| | A | B | C | D | E | F |
| Al | 89.0 wt. % | 90.7 wt. % | 90.6 wt. % | 95.2 wt. % | 97.5 wt. % | 96.6 wt. % |
| Mg | 1.0 wt. % | 1.2 wt. % | 0.5 wt. % | 0.6 wt. % | 0.4 wt. % | 0.4 wt. % |
| Si | | | | 0.7 wt. % | 0.6 wt. % | 0.5 wt. % |
| Zn | 6.6 wt. % | 5.0 wt. % | 5.0 wt. % | | | |
| Zr | 0.1 wt. % | 0.08 wt. % | 0.05 wt. % | | | |
| Mn | | | | 0.4 wt. % | | |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of manufacturing a laminated three-dimensional (3D) metallic object, comprising:
   providing a plurality of foils comprising a metal;
   marking portions of at least some of the foils in the plurality of foils with a marking agent comprising a material having an electrochemical potential that is higher than an electrochemical potential of the metal;
   boxing the plurality of marked foils into a box,
   fusion-bonding the plurality of marked foils into a block; and, consecutively,
   selectively etching parts of the bonded block which are not marked by the marking agent to retain the marked portions.

2. The method according to claim 1, further comprising: stacking and tacking the plurality of foils.

3. The method according to claim 1, wherein bonding comprises: providing at least one of: pressure and heat, to the plurality of marked foils.

4. The method according to claim 3, wherein bonding comprises one of: thermal diffusion bonding and forming transient liquid phase diffusion bonding between the metal in the foils and a component in the marking agent.

5. The method of claim 1, wherein the marking comprises one of:
   a. cladding the metal of the foils with the marking agent; and laser ablating at least portions of the cladding to reveal portions of the foils; and
   b. selectively depositing the marking agent on the surface of at least some of the foils.

6. The method according to 1, wherein the marking is according to a pattern determined based on a 3D model of the metallic object.

7. The method according to claim 1, further comprising at least one of:
   trimming the plurality of marked foils into a fixed size; and
   removing gas trapped between foils in the plurality of marked foils by at least one of:
      gradient heating and applying a convex depression plate.

8. The method according to claim 1, wherein selectively etching parts of the foils comprises selectively etching the bonded block in the presence of an etchant.

\* \* \* \* \*